United States Patent
Lien et al.

(10) Patent No.: US 10,750,318 B2
(45) Date of Patent: Aug. 18, 2020

(54) POSITIONING SYSTEM AND POSITIONING METHOD THEREOF

(71) Applicants: LITE-ON ELECTRONICS (GUANGZHOU) LIMITED, Guangzhou (CN); LITE-ON TECHNOLOGY CORPORATION, Taipei (TW)

(72) Inventors: Pei-Yuan Lien, Taipei (TW); Johnson Lee, Taipei (TW); Chun-Tao Chen, Taipei (TW); Yao-Chung Yeh, Taipei (TW)

(73) Assignees: LITE-ON ELECTRONICS (GUANGZHOU) LIMITED, Guangzhou (CN); LITE-ON TECHNOLOGY CORPORATION, Taipei (TW)

( * ) Notice: Subject to any disclaimer, the term of this patent is extended or adjusted under 35 U.S.C. 154(b) by 357 days.

(21) Appl. No.: 15/613,384

(22) Filed: Jun. 5, 2017

(65) Prior Publication Data
US 2018/0146333 A1    May 24, 2018

(30) Foreign Application Priority Data
Nov. 24, 2016 (CN) .......................... 2016 1 1044202

(51) Int. Cl.
H04W 4/02 (2018.01)
H04B 1/48 (2006.01)

(52) U.S. Cl.
CPC .............. *H04W 4/023* (2013.01); *H04B 1/48* (2013.01)

(58) Field of Classification Search
CPC .......... G01S 19/12; H04B 1/48; H04W 4/023; H04W 4/025
USPC ..................................................... 342/357.49
See application file for complete search history.

(56) References Cited

U.S. PATENT DOCUMENTS

| | | | | |
|---|---|---|---|---|
| 5,989,761 | A * | 11/1999 | Kawakubo | G03F 7/70358 430/22 |
| 2002/0176971 | A1* | 11/2002 | Ohsawa | G11B 7/00745 428/64.4 |
| 2009/0285063 | A1* | 11/2009 | Blacquiere | G11B 20/1217 369/47.14 |
| 2014/0064567 | A1* | 3/2014 | Kim | G06T 7/223 382/107 |
| 2018/0178039 | A1* | 6/2018 | Petterson | A61B 6/00 |

\* cited by examiner

*Primary Examiner* — Dao L Phan
(74) *Attorney, Agent, or Firm* — McClure, Qualey & Rodack, LLP

(57) ABSTRACT

A positioning method including following steps is provided. Firstly, several base stations are commanded to detect a tracked object. Then, a first position of the tracked object is obtained according to the first return information. Then, several fixed-type signal transceivers are selected according to the first position. Then, the selected fixed-type signal transceivers are commanded to detect the tracked object, and a second position of the tracked object is obtained according to the second return information received from the fixed-type signal transceivers.

19 Claims, 4 Drawing Sheets

POSITIONING SYSTEM AND POSITIONING METHOD THEREOF

This application claims the benefit of People's Republic of China application Serial No. 201611044202.1, filed Nov. 24, 2016, the subject matter of which is incorporated herein by reference.

BACKGROUND OF THE INVENTION

Field of the Invention

The invention relates in general to a positioning system and a positioning method thereof, and more particularly to a positioning system using fixed-type signal transceivers and a method using the same to perform a multi-layer positioning.

Description of the Related Art

Conventional positioning systems, such as the global positioning system (GPS), position a tracked object through the signals of the satellites above the earth. However, although the GPS achieves high accuracy in positioning, its configuration cost is expensive.

Therefore, it has become a prominent task for the industry to provide a new technology to resolve the problem.

SUMMARY OF THE INVENTION

The invention is directed to a multi-layer positioning method capable of resolving the problems encountered in the prior art.

According to one embodiment of the present invention, a positioning method used in a positioning system is provided. The positioning system includes a plurality of base stations each having a corresponding signal receiver group comprising a plurality of fixed-type signal transceivers. The positioning method includes the following steps. Several base stations are commanded to detect a tracked object and generate a plurality of first return information. A first position of the tracked object is obtained according to the first return information. Some of the fixed-type signal transceivers are selected according to the first position. The selected fixed-type signal transceivers are commanded to detect the tracked object, and a second position of the tracked object is obtained according to the second return information received from the selected fixed-type signal transceivers.

According to another embodiment of the invention, a positioning system including a server, at least one base station, and at least one signal receiver group is provided. The at least one signal receiver group corresponds to the base station, and includes several fixed-type signal transceivers. The server commands the base station to detect a tracked object and obtain a first position of the tracked object. The server selects some of the fixed-type signal transceivers near the first position to detect the tracked object. The server obtains a second position of the tracked object according to the return information received from the selected fixed-type signal transceivers.

According to one embodiment of the present invention, a positioning method used in a positioning system to detect a tracked object is provided. The positioning method includes the following steps. A first layer positioning is performed for obtaining a first position of the tracked object. Then, a second layer positioning is performed based on the first position to obtaining a second position of the tracked object, wherein the first layer positioning has larger positioning error than the second layer positioning.

The above and other aspects of the invention will become better understood with regard to the following detailed description of the preferred but non-limiting embodiment (s). The following description is made with reference to the accompanying drawings.

DETAILED DESCRIPTION OF THE INVENTION

Figure 1A:
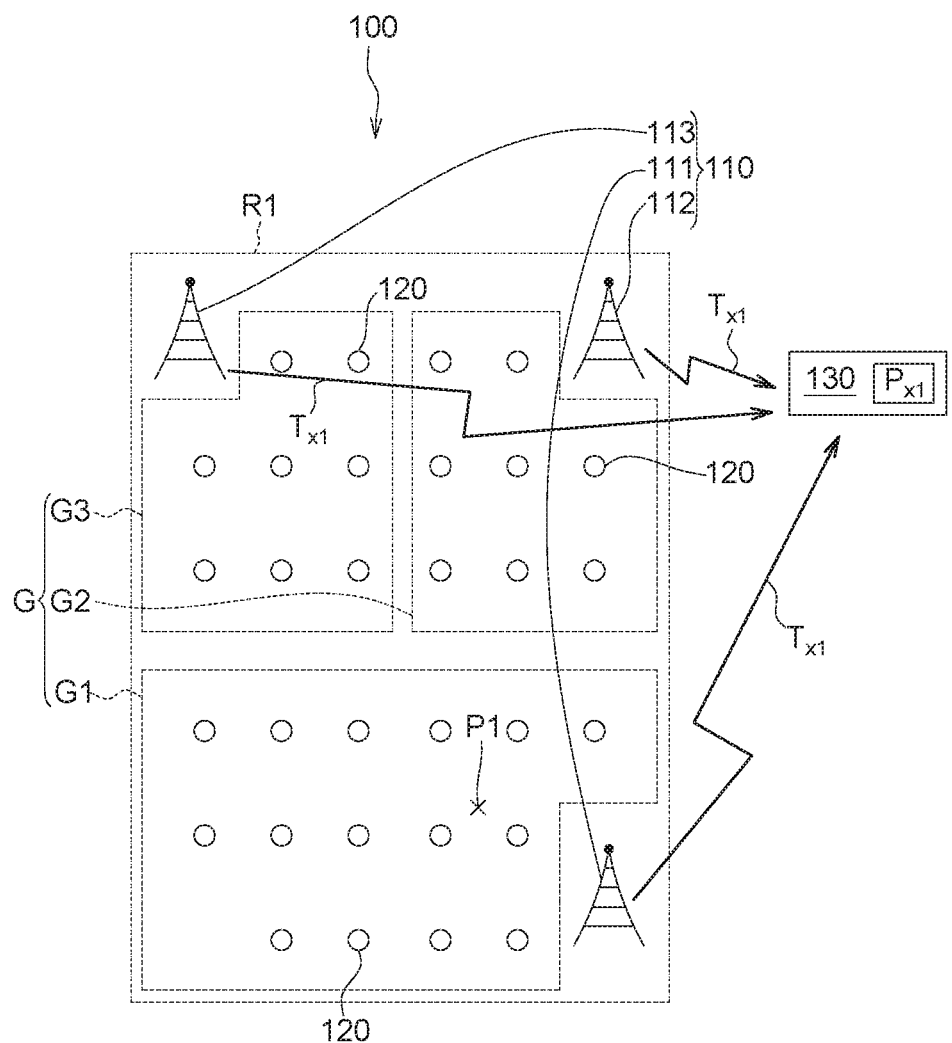
FIGS. 1A and 1B respectively are schematic diagrams of a positioning system according to an embodiment of the invention.
Figure 1B:
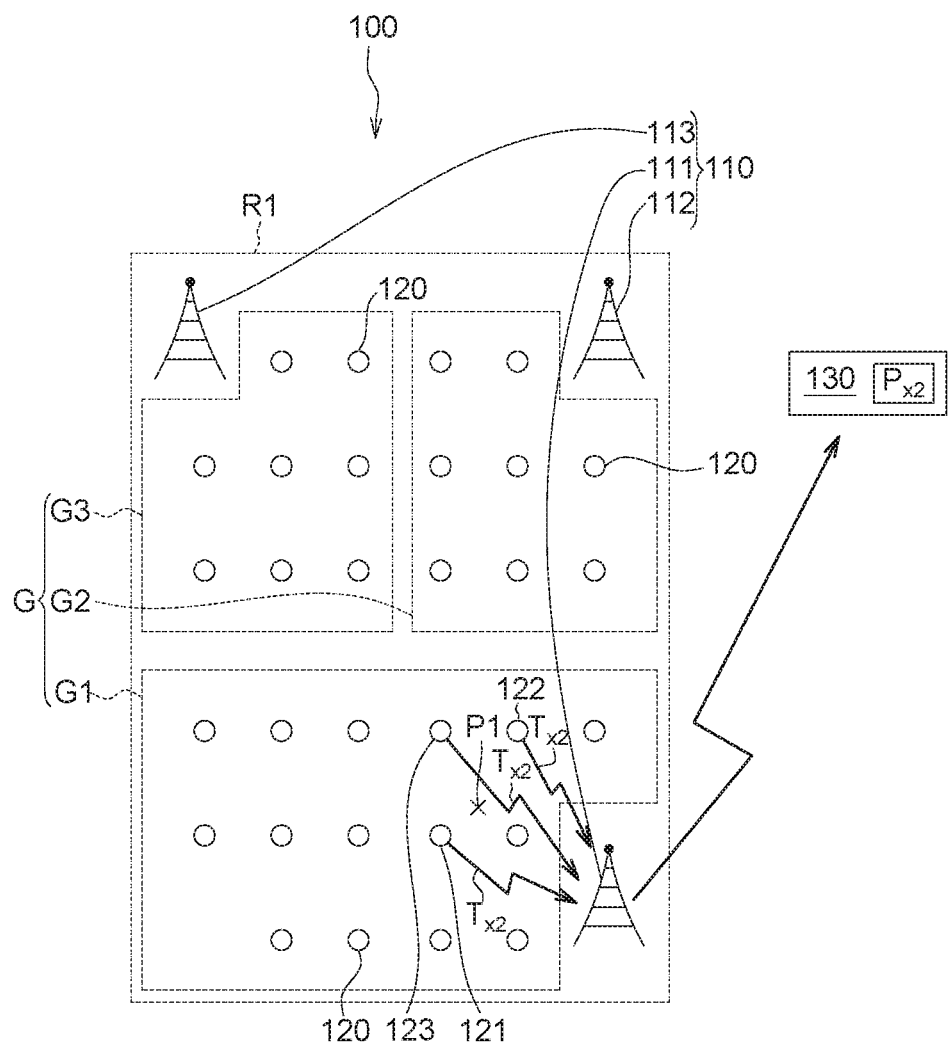

Referring to FIGS. 1A and 1B, schematic diagrams of a positioning system 100 according to an embodiment of the invention are shown. The positioning system 100 includes at least one base station 110, at least one signal receiver group G and a server 130. Each signal receiver group G corresponds to the base station 110, and includes several fixed-type signal transceivers 120. Each fixed-type signal transceiver 120 of the signal receiver group G can transmit signals to the corresponding base station 110 and receive signals from the same.

In the embodiment of FIG. 1A, the quantity of base stations 110 is exemplified by three, namely a first base station 111, a second base station 112 and a third base station 113. However, the quantity of base stations 110 can be more than three. Each base station 110 has a corresponding signal receiver group G. For example, the first base station 111 corresponds to the first signal receiver group G1, the second base station 112 corresponds to the second signal receiver group G2, and the third base station 113 corresponds to the third signal receiver group G3. Each of the signal receiver groups G1, G2 and G3 includes several fixed-type signal transceivers 120. Each fixed-type signal transceiver 120 of the first signal receiver group G1 can transmit signals to the corresponding first base station 111 and receive signals from the same. Each fixed-type signal transceiver 120 of the second signal receiver group G2 can transmit signals to the corresponding second base station 112 and receive signals from the same. Each fixed-type signal transceiver 120 of the third signal receiver group G3 can transmit signals to the corresponding third base station 113 and receive signals from the same.

In an embodiment, each fixed-type signal transceiver 120 has a corresponding receiver identification and a corresponding receiver position information. The transmission signal of each fixed-type signal transceiver 120 includes the receiver identification and/or the receiver position information. The receiver identification and the receiver position information vary from one fixed-type signal transceiver 120 to another. The receiver position information is such as the coordinates of latitude and longitude.

In an embodiment, the fixed-type signal transceivers 120 can be disposed on any fixed-type objects such as street lights, poles, substations, buildings, and traffic signs. The server 130 can be disposed on one of the base stations 110, or can be disposed on the same device with one of the fixed-type signal transceivers 120. Or, the server 130, the base stations 110 and the fixed-type signal transceivers 120 can be disposed separately. The server 130 can be disposed within or outside the positioning range R1. The positioning range R1 is a range within which the positioning system 100 can position a tracked object P1. The server 130 can receive transmission signals from the base stations 110 and can command the base stations 110 to detect the tracked object P1. Examples of the tracked object P1 include wearable device, vehicle, transportation, or logistics management object that has a signal transmitter disposed thereon.

According to the embodiment, in the positioning range R1, the distance between adjacent two base stations 110 is longer than that between adjacent two fixed-type signal transceivers 120. As shown in FIGS. 1A and 1B, the distance between adjacent two base stations 111 and 112 is longer than that between adjacent two fixed-type signal transceivers 121 and 123. In the positioning range R1, the quantity of the base stations 110 is less than that of the fixed-type signal transceivers.

Figure 2:
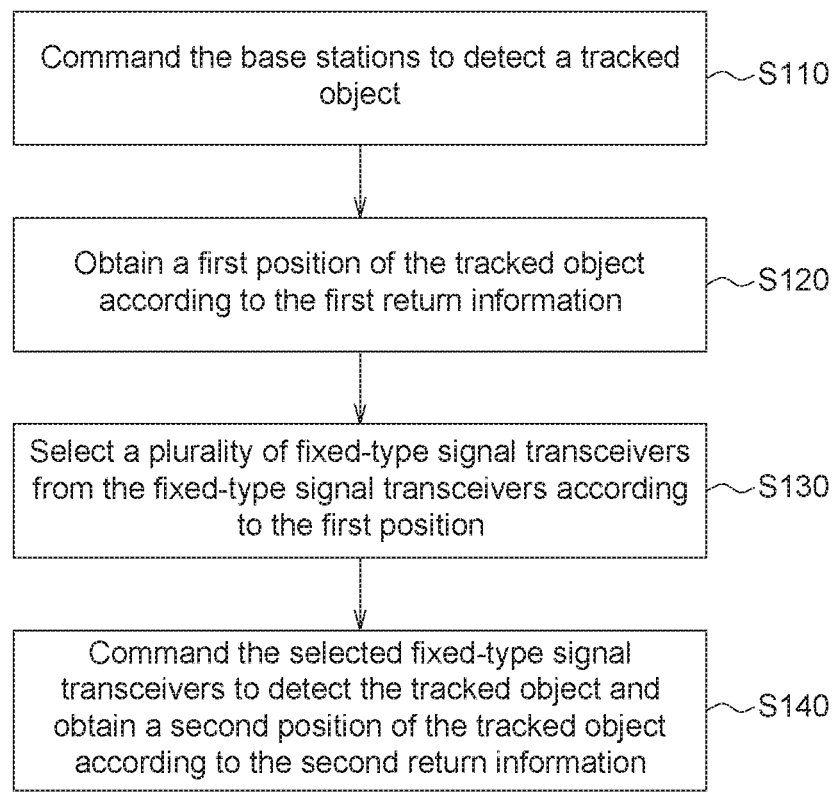
FIG. 2 is a flowchart of a multi-layer positioning method according to an embodiment of the invention.

Referring to FIG. 2, a flowchart of a multi-layer positioning method according to an embodiment of the invention is shown. Firstly, the method begins at step S110, the base stations 110 are commanded by the server 130 to detect the tracked object P1 to check whether the tracked object P1 is within the positioning range R1. Then, the method proceeds to step S120, when it is determined that the tracked object P1 is within the positioning range R1, a first position of the tracked object P1 is obtained by the server 130 according to the first return information. Then, the method proceeds to step S130, several fixed-type signal transceivers 120 are selected by the server 130 according to the first position. In step S140, the selected fixed-type signal transceivers 120 are commanded by the server 130 to detect the tracked object P1, and a second position of the tracked object P1 is obtained by the server 130 according to the second return information. In an embodiment, the server 130 commands the selected fixed-type signal transceivers 120 through the corresponding base station 110 of the selected fixed-type signal transceivers 120 to detect the tracked object P1.

In the embodiment, the first position of the tracked object P1 is detected according to a first layer positioning (step S110 and S120), and the second position of the tracked object P1 is detected according to a second layer positioning (step S130 and S140). The first layer positioning has larger positioning error than the second layer positioning.

In an embodiment, the first position of the tracked object P1 can be directly detected through the base station 110 (step S110 and S120), and the second position of the tracked object P1 can be detected through the fixed-type signal transceivers 120 (step S130 and S140). The embodiments of the invention are described below with exemplifications.

In step S110, as indicated in FIG. 1A, several base stations 110, such as the first base station 111, the second base station 112 and the third base station 113, are commanded by the server 130 to detect the tracked object P1. When the tracked object P1 enters the positioning range R1, the base station 110 can detect the tracked object P1. As disclosed above, the positioning range R1 is a range within which the positioning system 100 can position the tracked object P1. For example, the positioning range R1 is a range within which the positioning system 100 can position the tracked object P1 through the first base station 111, the second base station 112 and the third base station 113.

In an embodiment, the base stations 110 can continuously detect whether the tracked object P1 enters the positioning range R1. When the tracked object P1 enters the positioning range R1, the base stations 110 automatically send a message to inform the server 130 that the tracked object P1 has been detected. In another embodiment, the base stations 110 detect whether the tracked object P1 enters the positioning range R1 only after the server 130 has commanded the base stations 110 to locate the tracked object P1. Besides, the server 130 can command the base stations 110 to locate the tracked object P1 by using an application program (APP) of a handheld device (not illustrated), such as s smart phone.

In step S120, as indicated in FIG. 1A, when the first base station 111, the second base station 112 and the third base station 113 detect that the tracked object P1 enters the positioning range R1, the first base station 111, the second base station 112 and the third base station 113 send a first return information $T_{x1}$ to the server 130, which calculates the first position $P_{x1}$ of the tracked object P1 according to the first return information $T_{x1}$. The first return information $T_{x1}$ can be the time at which the tracked object P1 is detected by the base station. For example, the first return information $T_{x1}$ sent to the server 130 by the first base station 111, the second base station 112 and the third base station 113 are the time at which the tracked object P1 is detected by the first base station 111, the second base station 112 and the third base station 113 respectively, and the values of the time may not be the same.

In an embodiment, the tracked object P1 can register identity on the positioning system 100 beforehand, so that the base stations 110 can recognize the tracked object P1 according to the registered identity. In an embodiment, the server 130 can position the tracked object P1 using the time difference of arrival (TDOA) technology. When the server 130 receives the first return information $T_{x1}$ from the first base station 111, the second base station 112 and the third base station 113, the server 130 also receives the time at which the tracked object P1 is detected by the first base station 111, the second base station 112 and the third base station 113 respectively, and accordingly calculates the first position $P_{x1}$ of the tracked object P1 according to the first return information $T_{x1}$.

Generally speaking, the quantity of base stations 110 is exemplified by three. The error in positioning the tracked object P1 by the three base stations 110 is basically 300 meters or larger. The large the quantity of base stations 110, the smaller the error in positioning the tracked object P1 but the higher the configuration cost of the base stations 110. In following steps, the positioning method disclosed in the embodiments of the invention effectively reduces the positioning error by using several fixed-type signal transceivers 120.

In step S130, it enters the second positioning layer. As indicated in FIG. 1B, several fixed-type signal transceivers 120 are selected by the server 130 according to the first position $P_{x1}$. For example, the server 130 selects several fixed-type signal transceivers 120 near the first position $P_{x1}$, such as the fixed-type signal transceivers 121, 122 and 123, and further commands the selected fixed-type signal transceivers to detect the tracked object P1. The fixed-type signal transceivers 121, 122 and 123 can be the fixed-type signal transceivers closest to the first position $P_{x1}$, but the embodiments of the invention are not limited thereto.

The more the signals of fixed-type signal transceivers 120 are used to calculate the coordinates of the tracked object P1 by the server 130, the smaller the positioning error of the tracked object P1 will be generated.

In an embodiment, the fixed-type signal transceivers 120 can be realized by low power consumption wireless receivers, the tracked object P1 includes a low power consumption wireless emitter, and the base stations 110 include low power consumption wireless receivers, wherein, signals are transmitted and/or received between the fixed-type signal transceivers 120, the tracked object P1 and the base stations 110 by using the low power consumption wireless technology.

In an embodiment, the low power consumption wireless technology is exemplified by the LoRa, Zigbee, Sub1G or Z-wave wireless technology. In an embodiment, the fixed-type signal transceivers 120 can be realized by LoRa receivers and the tracked object P1 may include a LoRa emitter which transmits signals using the LoRa wireless technology. The base stations 110 may include a LoRa receiver, which receives and transmits the LoRa signal to the fixed-type signal transceivers 120. While conventional 4G wireless technology and GPS wireless technology have the disadvantage of high power consumption, the LoRa wireless technology has the advantage of low power consumption. Due to the low power consumption of the LoRa wireless technology, the tracked object P1 can continuously transmit signals over a long period of time, such that the fixed-type signal transceivers 121~123 can continuously receive signals from the tracked object P1, and can continuously transmit signals to the base stations 110 over a long period of time.

In step S140 as indicated in FIG. 1B, the selected fixed-type signal transceivers 121~123 are commanded to detect the tracked object P1 by the server 130 through the corresponding first base stations 111 of the selected fixed-type signal transceivers 121~123. The fixed-type signal transceivers 121~123 send a second return information $T_{x2}$ to the first base station 111, wherein the second return information $T_{x2}$ includes the position information of the transmission signal of the tracked object P1, an identity of the tracked object P1, and the receiver identifications and the receiver position information of the fixed-type signal transceivers 121~123. The server 130 further calculates the second position $P_{x2}$ of the tracked object P1 according to the second return information $T_{x2}$ by using such as the triangle positioning technology. In the embodiments of the invention, the positioning error of the second position $P_{x2}$ of the tracked object P1 can be reduced to 3 meters through second time positioning performed by the fixed-type signal transceivers 120.

The position information of the transmission signal of the tracked object P1 includes signal intensity and/or reception time, wherein signal intensity can be exemplified by a received signal strength indicator (RSSI) and/or a signal-to-noise ratio (SNR). The position information of the transmission signal of the tracked object P1 received by each of the fixed-type signal transceivers 120 may not be the same. For example, according to the distance to the tracked object P1, the intensity and/or reception time of the transmission signal of the tracked object P1 received by each of the fixed-type signal transceivers 121~123 may not be the same. For 2.5 example, the position information of the second return information $T_{x2}$ sent to the first base station 111 by the fixed-type signal transceivers 121~123 include the intensity and/or reception time of the transmission signal of the tracked object P1 received by each of the fixed-type signal transceivers 121~123, and the values of the position information may not be the same.

In another embodiment, the base stations 110 can detect the first position of the tracked object P1 through the fixed-type signal transceivers 120 (step S110 and S120), and detect the second position of the tracked object P1 through the fixed-type signal transceivers 120 (step S130 and S140). Detailed descriptions of the embodiment are disclosed below with examples.

Figure 3:
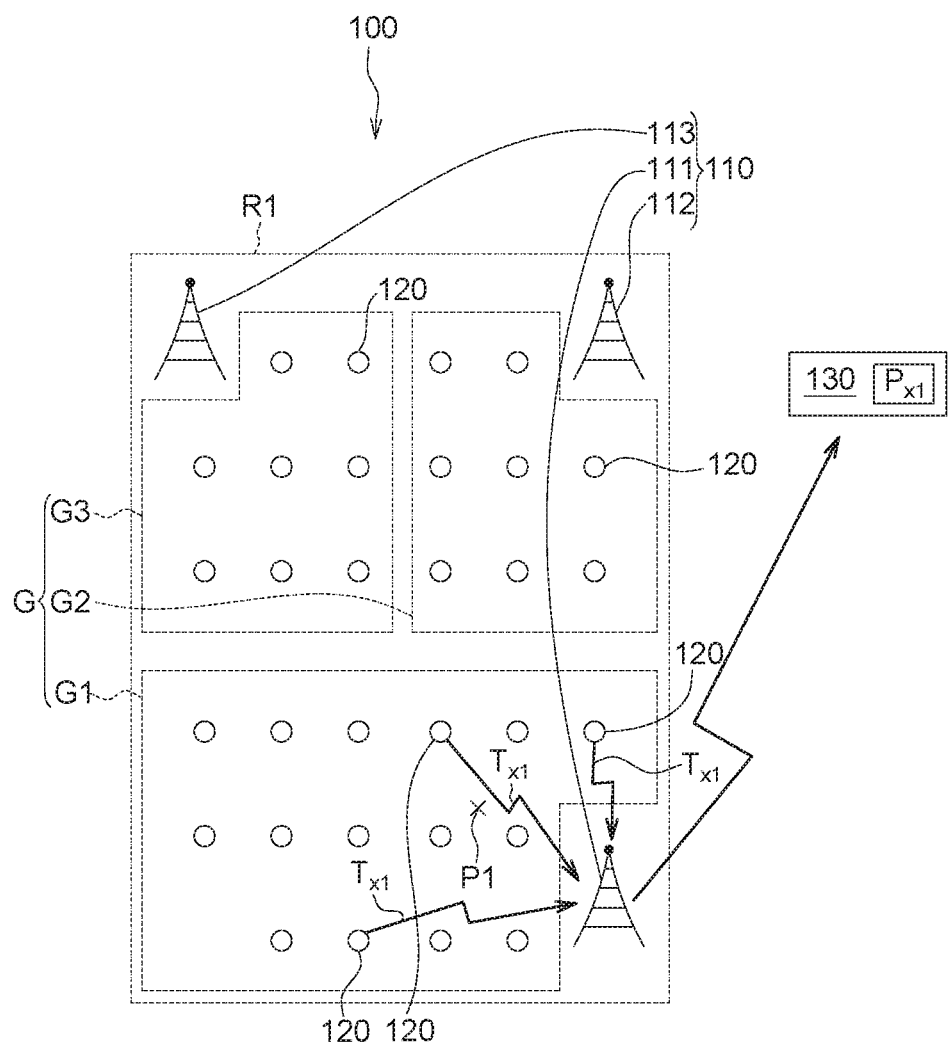
FIG. 3 is a schematic diagram of a positioning method according to another embodiment of the invention.

In step S110, as indicated in FIG. 3, a schematic diagram of a positioning method according to another embodiment of the invention is shown. When the server 130 commands several base stations 110, such as the first base station 111, the second base station 112 and the third base station 113, to detect the tracked object P1, the base stations 110 further command several fixed-type signal transceivers 120 in the corresponding signal receiver group G to detect the tracked object P1. For example, the first base station 111 commands several fixed-type signal transceivers 120 in the corresponding signal receiver group G1, the second base station 112 commands several fixed-type signal transceivers 120 in the corresponding signal receiver group G2, and the third base station 113 commands several fixed-type signal transceivers 120 in the corresponding signal receiver group G3 to detect the tracked object P1.

When the tracked object P1 is detected by one of the fixed-type signal transceivers 120, a first return information $T_{x1}$ is sent to the corresponding base station 110, wherein the first return information $T_{x1}$ is such as the receiver identifications and the position information of the fixed-type signal transceivers 120 and the identity of the tracked object P1. In other embodiments, the positioning system 100 can be designed as: the first return information $T_{x1}$ is sent to the corresponding base station 110 only by the fixed-type signal transceiver 120 which detects the tracked object P1. The first return information $T_{x1}$ can omit the identity of the tracked object P1.

In step S120, the server 130 again obtains the first position $P_{x1}$ of the tracked object P1 according to the first return information $T_{x1}$. For example, after one of the fixed-type signal transceivers 120 of the first signal receiver group G1 detects the tracked object P, the fixed-type signal transceiver 120 sends the first return information $T_{x1}$ to the first base station 111. Since the first return information $T_{x1}$ includes the position information of the receiver of the fixed-type signal transceivers 120, the server 130 can set the first position $P_{x1}$ of the tracked object P1 as the position information of the receiver.

Then, the method proceeds to step S130, as indicated in FIG. 1B, several fixed-type signal transceivers 120 are selected by the server 130 according to the first position $P_{x1}$. For example, the server 130 selects several fixed-type signal transceivers 120 closest to the first position $P_{x1}$, such as the fixed-type signal transceivers 121, 122 and 123, and further commands the selected fixed-type signal transceivers to detect the tracked object P1. Steps S130 and S140 of the present embodiment are similar to steps S130 and S140 of previous embodiment, and the similarities are not repeated here.

Besides, the positioning method of the invention embodiment can perform dynamic tracking to the tracked object P1. For example, after the second position $P_{x2}$ is obtained, the server 130 can set the second position $P_{x2}$ as a new first position $P_{x1}$, and then repeats step S130 and step S140, again select the fixed-type signal transceivers 120 near the new first position $P_{x1}$ to perform positioning and continuously obtain a new second position $P_{x2}$ of the tracked object P1. Thus, even when the tracked object P1 is in a moving state, the movement of the tracked object P1 still can be detected by the positioning system 100.

To summarize, according to the embodiments of the invention, a first positioning is performed to the tracked object by several base stations or fixed-type signal transceivers, then the transmission signal of the tracked object is received by the fixed-type signal transceivers near the tracked object to perform a second time of position which is more accurate than the first positioning. Thus, the positioning error of the second positioning of the tracked object can be reduced. In an embodiment, the fixed-type signal transceivers are low power consumption wireless receivers having the features of low power consumption and low costs, such that the positioning system of the embodiment of the invention can achieve small positioning error with low configuration cost. Furthermore, since the tracked object and the fixed-type signal transceivers adopt the low power consumption wireless communication technology, the tracked object can transmit signals over a long period of time, such that the fixed-type signal transceivers near the tracked object can continuously detect the movement of the tracked object.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A positioning method used in a positioning system, wherein the positioning system comprises a plurality of base stations each having a corresponding signal receiver group comprising a plurality of fixed-type signal transceivers, and the positioning method comprises:
    commanding the base stations to detect a tracked object and generate a plurality of first return information;
    performing a first layer positioning to obtain a first position of the tracked object according to the first return information;
    selecting some of the fixed-type signal transceivers according to the first position; and
    commanding the selected fixed-type signal transceivers to detect the tracked object and perform a second layer positioning based on the first position to obtain a second position of the tracked object according to a plurality of second return information received from the selected fixed-type signal transceivers, wherein the first layer positioning has larger positioning error than the second layer positioning.

2. The positioning method according to claim 1, wherein each first return information refers to time at which the tracked object is detected by the corresponding base station.

3. The positioning method according to claim 1, further comprising:
    commanding the base station to command the fixed-type signal transceivers in the corresponding signal receiver group to detect the tracked object.

4. The positioning method according to claim 3, wherein each first return information refers to a receiver identification and a receiver position information of the corresponding fixed-type signal transceiver.

5. The positioning method according to claim 3, wherein the first return information contain a receiver position information corresponding to one of the fixed-type signal transceivers which detects the tracked object, and the receiver position information is set as the first position.

6. The positioning method according to claim 1, wherein each second return information comprises a position information of a transmission signal of the tracked object, an identity of the tracked object, a receiver identification and a receiver position information of the corresponding fixed-type signal transceiver.

7. The positioning method according to claim 6, wherein the position information of the transmission signal comprises at least one of signal intensity and time.

8. The positioning method according to claim 1, wherein in the step of commanding the selected fixed-type signal transceivers to detect the tracked object, the selected fixed-type signal transceivers are commanded to detect the tracked object through the corresponding base station of the selected fixed-type signal transceivers.

9. The positioning method according to claim 1, further comprising:
    setting the second position as a new first position; and
    performing the step of selecting the fixed-type signal transceivers according to the first position and the step of commanding the selected fixed-type signal transceivers to detect the tracked object and obtain the second position of the tracked object according to the second return information received from the fixed-type signal transceivers.

10. The positioning method according to claim 1, wherein signals are transmitted and/or received between each of the fixed-type signal transceivers and the tracked object by using a low power consumption wireless technology.

11. The positioning method according to claim 1, wherein the selected fixed-type signal transceivers are near the first position.

12. The positioning method according to claim 1, wherein a positioning range is defined as a range within which the positioning system can position the tracked object, wherein in the positioning range, the distance between adjacent two base stations is longer than that between adjacent two fixed-type signal transceivers.

13. The positioning method according to claim 1, wherein a positioning range is defined as a range within which the positioning system can position the tracked object, wherein in the positioning range, the quantity of the base stations is less than that of the fixed-type signal transceivers.

14. A positioning system, comprising:
    a server;
    at least one base station; and
    at least one signal receiver group corresponding to the base station and comprising a plurality of fixed-type signal transceivers;
    wherein the server commands the base station to detect a tracked object and perform a first layer positioning to obtain a first position of the tracked object, selects some of the fixed-type signal transceivers near the first position to detect the tracked object, and perform a second layer positioning based on the first position to obtain a second position of the tracked object according to a plurality of return information received from the selected fixed-type signal transceivers, wherein the first layer positioning has larger positioning error than the second layer positioning.

15. The positioning system according to claim 14, wherein the server further sets the second position as a new first position, and again selects some of the fixed-type signal transceivers near the new first position to detect the tracked object, and obtains the second position of the tracked object according to the return information received from the selected fixed-type signal transceivers.

16. The positioning system according to claim 14, wherein the server commands the base station to command the fixed-type signal transceivers in the corresponding signal receiver group to detect the tracked object and obtain the first position of the tracked object.

17. The positioning system according to claim 16, wherein the server receives a receiver position information corresponding to one of the fixed-type signal transceivers which detects the tracked object and sets the receiver position information as the first position.

18. A positioning method used in a positioning system to detect a tracked object, comprises:

performing a first layer positioning to obtain a first position of the tracked object; and performing a second layer positioning based on the first position to obtain a second position of the tracked object, wherein the first layer positioning has larger positioning error than the second layer positioning, wherein the positioning system comprises a plurality of fixed-type signal transceivers, and, in the first layer positioning, a receiver position information corresponding to one of the fixed-type signal transceivers which detects the tracked object is set as the first position.

19. A positioning method used in a positioning system to detect a tracked object, comprises:

performing a first layer positioning to obtain a first position of the tracked object; and performing a second layer positioning based on the first position to obtain a second position of the tracked object, wherein the first layer positioning has larger positioning error than the second layer positioning, wherein the positioning system comprises a plurality of fixed-type signal transceivers, and, in the second layer positioning, some of the fixed-type signal transceivers near the first position are selected to detect the tracked object, and the second position of the tracked object is obtained according to a plurality of return information received from the selected fixed-type signal transceivers.

* * * * *